(12) United States Patent
Berg et al.

(10) Patent No.: US 11,912,187 B2
(45) Date of Patent: *Feb. 27, 2024

(54) STORAGE DEVICE AND VEHICLE

(71) Applicant: Bayerische Motoren Werke Aktiengesellschaft, Munich (DE)

(72) Inventors: Hannes Berg, Munich (DE); Julia Schiller, Eichstaett (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 324 days.

This patent is subject to a terminal disclaimer.

(21) Appl. No.: 17/298,993

(22) PCT Filed: Dec. 11, 2019

(86) PCT No.: PCT/EP2019/084656
§ 371 (c)(1),
(2) Date: Jun. 2, 2021

(87) PCT Pub. No.: WO2020/120580
PCT Pub. Date: Jun. 18, 2020

(65) Prior Publication Data
US 2022/0048423 A1 Feb. 17, 2022

(30) Foreign Application Priority Data
Dec. 13, 2018 (DE) ...................... 10 2018 132 164.3

(51) Int. Cl.
*B60N 3/00* (2006.01)
(52) U.S. Cl.
CPC ............. *B60N 3/004* (2013.01); *B60N 3/007* (2013.01)

(58) Field of Classification Search
CPC ................ A47B 1/06; A47B 2096/203; A47B 2096/204; A47B 2220/0055; A47B 96/202; B60N 3/004; B60N 3/007
See application file for complete search history.

(56) References Cited

U.S. PATENT DOCUMENTS

| 508,938 | A | * | 11/1893 | Hamilton | ................. | A47B 5/06 |
| | | | | | | 108/68 |
| 1,562,944 | A | * | 11/1925 | Davidson | ............... | A47B 81/00 |
| | | | | | | 312/297 |

(Continued)

FOREIGN PATENT DOCUMENTS

| DE | 696 03 063 T2 | 12/1999 |
| DE | 10 2007 011 055 A1 | 9/2008 |

(Continued)

OTHER PUBLICATIONS

English translation of Chinese-language Office Action issued in Chinese Application No. 201980077750.X dated May 13, 2023 (2 pages).

(Continued)

*Primary Examiner* — Matthew W Ing
(74) *Attorney, Agent, or Firm* — Crowell & Moring LLP

(57) ABSTRACT

A storage device for a vehicle has a guide unit and a hinge element which can be guided on the guide unit and is moveably guided along the guide unit in a drawer-type manner. The hinge element has a contact rest surface and at least one lateral wall at an angle to same. The lateral wall has a plurality of fold regions such that a first hinge part and a second hinge part are formed between fold lines in such a way that, in a use position, the storage device forms a stable support for objects.

14 Claims, 6 Drawing Sheets

(56) References Cited

U.S. PATENT DOCUMENTS

| | | | | |
|---|---|---|---|---|
| 1,566,200 | A | * | 12/1925 | Giard ...................... A47B 3/04 |
| | | | | 108/68 |
| 1,950,927 | A | * | 3/1934 | McMillan ............... B60R 5/047 |
| | | | | 296/37.16 |
| 4,795,206 | A | * | 1/1989 | Adams ...................... B60J 5/14 |
| | | | | 296/100.09 |
| 2004/0020956 | A1 | | 2/2004 | Lobanoff |
| 2021/0289938 | A1 | * | 9/2021 | Scalf .................... F25D 25/024 |

FOREIGN PATENT DOCUMENTS

| | | |
|---|---|---|
| DE | 10 2012 013 013 | 1/2014 |
| GB | 2538823 A | 11/2016 |
| KR | 10-2018-0125913 A | 11/2018 |

OTHER PUBLICATIONS

International Search Report (PCT/ISA/210) issued in PCT Application No. PCT/EP2019/084656 dated Feb. 21, 2020 with English translation (four (4) pages).

German-language Written Opinion (PCT/ISA/237) issued in PCT Application No. PCT/EP2019/084656 dated Feb. 21, 2020 (five (5) pages).

German-language Search Report issued in German Application No. 10 2018 132 164.3 dated Aug. 19, 2019 with an English translation (11 pages).

* cited by examiner

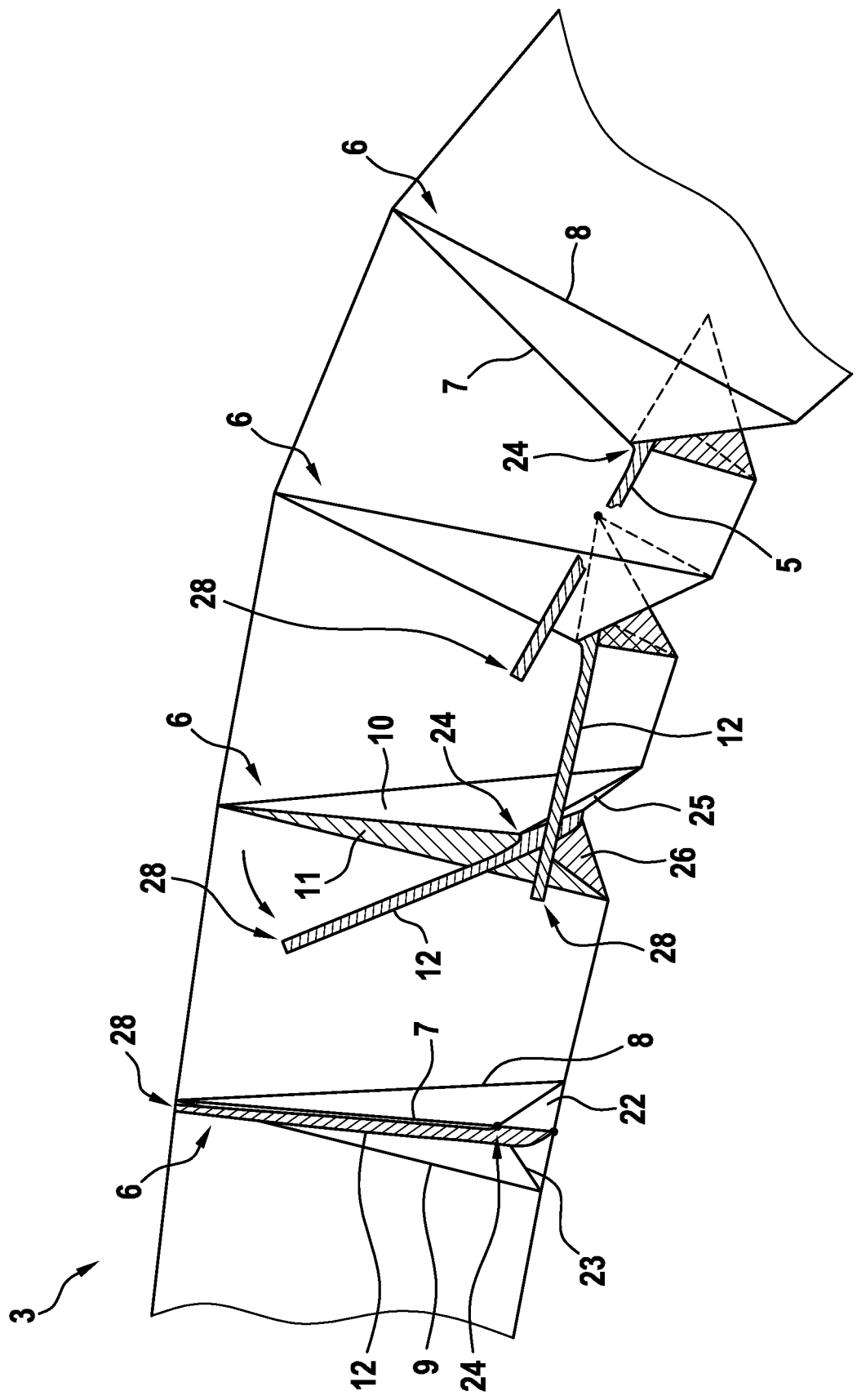

STORAGE DEVICE AND VEHICLE

BACKGROUND AND SUMMARY OF THE INVENTION

The invention relates to a storage device for a vehicle. Furthermore, the invention relates to a vehicle with at least one vehicle interior component, which is arranged in a passenger compartment, and with at least one storage device which is arranged on the vehicle interior component for temporarily depositing and storing at least one object.

In their passenger interior compartments, vehicles have various storage possibilities for temporarily depositing and storing objects. For example, there can be storage compartments which can be locked or cannot be locked, pockets which can be expanded elastically, or drawers. It is known, for example, for at least one storage possibility, for example in the form of a cup holder, to be provided on the center console.

It is a disadvantage of conventional storage possibilities, however, that objects which are stored therein, such as a smartphone, a key, sunglasses or the like, slip within the storage possibility during driving of the vehicle, as a result of which disruptive noise is produced and the object and/or the storage possibility can be damaged. In addition, the conventional storage possibilities are usually of relatively complex design. Furthermore, conventional storage possibilities are frequently configured and arranged in such a way that the driver of the vehicle cannot completely examine and reach the storage space which is provided by way of the storage possibility.

One solution to these problems might be the creation of a storage possibility in the form of a drawer. To this end, however, pronounced encroaching into the installation space of the respective vehicle interior component which receives the storage possibility, for example the instrument panel or the center console, might occur, which usually cannot be realized on account of other installation space requirements.

It is an object of the invention to provide an installation space-saving storage possibility for objects to be stored.

This object is achieved by way of the independent patent claims. Advantageous refinements are described in the dependent patent claims, the following description and the figures, it being possible for these refinements, in each case per se or in different combinations of at least two of these refinements with one another, to represent a developing or advantageous aspect of the invention.

The object is therefore achieved by way of a storage device for a vehicle. This storage device comprises at least one guide unit which can be arranged on a vehicle interior component. The guide unit can in turn consist of a plurality of components, and particularly advantageously has a rail. Moreover, the storage device comprises at least one hinge element which can be guided on the guide unit and is guided along the guide unit such that it can be displaced in a drawer-like manner on a curved or angled-away movement path. The hinge element has a rest face and at least one side wall which is angled away with respect thereto. In particular, the side wall is guided in a dedicated guide unit. It is provided that the hinge element can be transferred between a storage position and a rest position. In the rest position, it is provided, in particular, that the hinge element has left the guide unit at least partially. In the rest position, a user can rest objects on the rest face, whereas the hinge element increases the freedom of movement of the user in the storage position.

The side wall comprises a first end and a second end. At the first end, the side wall bears against the rest face. The second end lies opposite the first end. It is provided here that the side wall has a multiplicity of folding regions which comprise a first folding line, a second folding line, a third folding line, a fourth folding line and a fifth folding line. The first folding line is placed between the second folding line and the third folding line, with the result that a first hinge part is formed between the first folding line and the second folding line, and a second hinge part is formed between the first folding line and the third folding line. Furthermore, it is provided that the second folding line and the third folding line are of non-parallel configuration with respect to one another, and a first spacing between the second folding line and the third folding line at the first end is smaller than a second spacing between the second folding line and the third folding line at the second end.

This achieves a situation where, in the case of folding in of the folding region, the first hinge part and the second hinge part form either a peak or a trough. Since the first spacing at the first end is different than the second spacing at the second end, the side wall is shortened by way of folding in of the folding region at the second end to a more pronounced extent than at the first end. This therefore makes it possible that the side wall can be moved together with the rest face along a curved path. Secondly, each folding region can also be blocked, with the result that the side wall acts as a reinforcement of the rest face, and the rest face is therefore provided as a rigid surface which can serve as a shelf or as a table surface.

The fourth folding line extends between the first folding line and the second folding line from the second end to the first folding line. The fifth folding line extends between the first folding line and the third folding line from the second end to the intersection point of the first folding line and fourth folding line. A third hinge part is therefore defined by the fourth folding line and the first folding line, while a fourth hinge part is defined by the fifth folding line and the first folding line. This makes opposing folding of the first hinge part and second hinge part possible, compared with the third hinge part and fourth hinge part. In particular, a translation of the attachment of the lever element can be achieved by the fourth folding line and fifth folding line. The lever element can therefore be used to achieve a complete change between minimum folding and maximum folding by a slight pivoting, in particular by 90°.

Furthermore, it is provided that a lever element is attached on each first folding line, advantageously between the second end and the intersection point with the fourth folding line and fifth folding line. The lever elements extend, in particular, in a region below the rest face. Since the lever elements are coupled directly to the first folding line, folding in or unfolding of the folding regions can be forced by way of a movement of the lever elements, in particular by way of a rotation. It is provided that each lever element can be pivoted by way of the guide unit, in order to transfer the first hinge part and the second hinge part selectively into a state which is folded into a peak or trough. The pivoting is, in particular, a rotation of the lever element away from the associated first folding line. At the same time, the third hinge part and the fourth hinge part are folded in an opposed manner with respect to the first hinge part and second hinge part. A different change in length therefore easily takes place at the first end and at the second end when the folding regions are folded. Therefore, the guide unit can guide the hinge element along the curved path.

In order to deposit and store an object in the storage device according to the invention, the hinge element is first of all moved from a retracted storage position into an extended rest position, the hinge element being guided positively along a curved or angled-away movement path by means of the guide unit. As a result, in particular, the rest face is exposed and is therefore available for storing at least one object. In its extended rest position, the rest element forms, as it were, a table. To this end, the hinge element leaves the guide element at least in regions. The hinge element can be moved from its rest position into its storage position again, the hinge element again being guided positively along the curved or angled-away movement path by means of the guide unit. The hinge element can remain in its storage position until the next use of the storage device, in order not to unnecessarily restrict the passenger interior compartment of the vehicle. The actuation of the storage device according to the invention can take place in a simple way by way of a single hand.

The guide unit is preferably attached in a stationary manner on a vehicle interior component, that is to say a vehicle component which is arranged in the passenger interior compartment. To this end, a corresponding installation space or movement shaft is to be provided on the passenger interior component.

The hinge element can provide a relatively large rest face which can be examined and reached satisfactorily in comparison with conventional storage possibilities, such as, for example, a cup holder. The rest element can be moved to and fro between the storage position and the rest position via a manual actuation or in an automated manner via a motorized actuation. The respective trapezoidal wall element of the respective side wall is connected to the base of the trapezium, that is to say the base side of the side wall, to the web of the rest element or the web section of the respective member.

It is preferably provided that the second folding line and the third folding line are arranged symmetrically with respect to the first folding line. Therefore, in particular, the first hinge part is the same size as the second hinge part. This simplifies the kinematics of folding in and unfolding. Therefore, in particular, a simple and reliable transfer of the storage device between the storage position and the rest position is achieved.

The first folding line, the second folding line and the third folding line advantageously meet one another at the first end. As a result, the hinge parts are of triangular configuration. This in turn simplifies the kinematics of folding in and unfolding. Moreover, a length change between the first end and the second end is maximized, since no length change takes place at the first end, whereas the second end is shortened by the spacing between the second folding line and the third folding line in the case of folding in of the folding region. Therefore, in particular, the rest face which is present at the first end is not impaired during folding, rather, it is merely curved along the curved movement path.

In one preferred embodiment, both the first hinge part and the second hinge part are configured in such a way that they have the shape of a right-angled triangle. As an alternative or in addition, it is preferably provided that the second folding line and the third folding line form an equilateral triangle together with a part region of the second end. In this way, kinematics of the fold are once again simplified, and an operating capability of the storage device is made possible in a manner which is simple and low in complexity, but at the same time is secure and reliable.

The lever elements are preferably configured in parallel with the side wall when the folding regions have a minimum fold. In contrast, the lever elements can be pivoted up to an angle of 90° with respect to the side wall, which results in a maximum fold of the folding regions. By way of the lever elements, it is therefore possible to set a fold of the folding regions, wherein, by securing the lever elements in the position in parallel with the side wall, a reinforcement of the hinge element is achieved. In order to move the hinge element along the curved path, the lever elements are pivoted, in order, as described above, to achieve the maximum fold.

As an alternative or in addition, the lever elements can preferably be latched on the side wall of the hinge element, in order to block a movement of the lever elements in at least one direction. This makes it possible, in particular, to leave the folding regions in an unfolded or merely minimally folded state. In this way, the hinge element particularly advantageously automatically remains in its reinforced state if no external influences act on the lever element. In this way, the hinge element can leave the guide unit without the reinforced state being abandoned.

The second folding line and the fourth folding line, and the third folding line and the fifth folding line respectively particularly advantageously meet one another at the second end. Simple folding kinematics can therefore be achieved, wherein, at the same time, the folding element in the folded state has a minimum dimension at the second end.

The hinge element particularly advantageously has two side walls. The side walls are in particular configured in parallel with one another. Here, it is particularly advantageously provided that the side walls form a U-shape with the rest face. In this way, in particular, a best possible reinforcement of the rest face in the rest position is made possible. Moreover, the rest face can be extended beyond a side wall or both side walls. This can be realized in one piece by way of an enlarged configuration of the rest face or by way of the application of an additional element to the rest face.

The storage device preferably has at least two hinge elements which are arranged in parallel. The rest faces of the hinge elements are connected, in particular, to a rest part. The rest part can be provided at least partially with a friction-increasing surface. In this way, a drawer-like system is achieved which, in particular on its edge regions, has hinge elements which make a movement along a curved path possible.

The first hinge part and the second hinge part can preferably be latched, in order to prevent folding of the folding region. As a result, it is possible that that section of the rest element which has been pulled or extended in an automated manner out of the vehicle interior component is reinforced on account of the latching action, in order for it to be possible for an object to be deposited on it. In the case of the movement of the rest element into its rest position, the latching actions are automatically released progressively or one after another, in order to make folding of the corresponding folding region possible. This takes place, in particular, by way of the lever elements which are guided in the guide unit.

In accordance with a further advantageous refinement, the storage device has at least one covering element which is arranged on the rest face of the hinge element, and at least one winding device which can be arranged in a stationary manner for winding/unwinding the covering element, which winding device defines a winding axis which is oriented transversely with respect to a displacement direction of the hinge element, the covering element being of elastic configuration, a free end section of the covering element, which free end section is arranged so as to face away from the winding device, being fixed on an end section of the rest face, which end section lies opposite a rest end section of the rest face for placing at least one object on the extended rest element, and the guide unit being configured and being arranged relative to the winding device in such a way that the rest end section of the rest face can be moved away from the winding device by a predefined extent. If there is a plurality of hinge elements, it is preferably provided that the covering element is arranged on the rest part which connects the rest faces of the hinge elements.

In order to deposit and store an object in the storage device according to this refinement, the hinge element is first of all moved from a retracted storage position into an extended rest position, the hinge element being positively guided along the curved or angled-away movement path by means of the guide unit. Here, the covering element is moved together with the rest element on account of it being fixed on the rest element, and is wound up by the winding device in the process. By way of the movement of the hinge element from its storage position into its rest position, the rest end section of the rest face is moved away from the winding device by the predefined extent, with the result that the rest face or the rest part is exposed and is available for the placing of at least one object.

After the object has been placed onto the rest face or the rest part, the hinge element can be moved again from its rest position into its storage position, the hinge element again being positively guided by means of the guide unit. Here, the covering element is moved together with the rest element on account of it being fixed on the rest element, and is unwound from the winding device in the process. In addition, the object is moved together with the rest element and, after passing the winding device, is received between the rest element and the covering element and is moved further here together with the rest element until the rest element has reached its storage position.

By way of the receiving of the object between the rest face or rest part and the covering element, the covering element is deformed elastically, as a result of which the object is clamped in between the rest element and the covering element. As a result, it can be reliably prevented that the object slips within the storage device during driving of the vehicle. Therefore, a disruptive development of noise which is due to slipping of this type and damage caused by way of slipping of this type, for example the formation of scratches and the like, can be reliably prevented on the object and the storage device.

If the object is to be removed again from the storage device, the hinge element is first of all moved from its storage position into its rest position, with the result that the rest side of the rest element and the object which is placed onto it are exposed again. The object can then be removed from the rest face or the rest part. Subsequently, the hinge element can be moved again into its storage position until the next use of the storage device, in order not to unnecessarily restrict the passenger interior compartment of the vehicle. The entire actuation of the storage device according to the invention can take place in a simple way using a single hand.

The covering element can be formed partially or completely, for example, from a monolithic flexible element or a woven fabric. An elastic covering element can be formed partially or completely, for example, from a flat elastomer body or an elastic woven fabric. That side of the covering element which faces the rest face can be provided at least partially with a friction-increasing surface. That free end section of the covering element which is arranged so as to face away from the winding device can be fixed, for example, in an integrally joined manner, by at least one seam or at least one mechanical connecting element on the end section of the rest element.

The winding device can be attached in a stationary manner on the guide unit or the vehicle interior component. The winding unit has at least one winding reel for winding/unwinding the covering element. In addition, the winding device has at least one prestressing element which, during unwinding of the covering element from the winding reel, is tensioned with the generation of a restoring force, the restoring force being used to automatically wind up the covering element onto the winding reel. The winding reel is arranged such that it can be rotated about the winding axis. The winding axis preferably runs perpendicularly with respect to the displacement direction of the rest element.

The folding region is particularly advantageously configured as an integral hinge. In this way, the individual folding lines can be produced simply and inexpensively, as described above. Secure and reliable operation of the storage device is also ensured. The hinge element can also be formed, in particular, from a plurality of links which are connected to one another in an articulated manner. Each link can be of dimensionally stable and/or solid configuration.

In accordance with a further advantageous refinement, the storage device has at least one handle which is fixed on the hinge element. The handle can be configured, for example, as a grip, knob, rail or the like, and serves for manual handling of the storage device.

In accordance with a further advantageous refinement, the storage device has at least one lamp which is arranged on the hinge element. As an alternative, the hinge element can also be configured as a lamp. As a result, for example, the positioning or the edge of the rest section of the rest face can be emphasized visually, in order to allow a person to place an object on the rest face, without high attention of the person being required to this end. As a result, in particular, a driver of the vehicle is distracted as little as possible from the traffic when placing an object on the rest face.

A vehicle according to the invention has at least one vehicle interior component which is arranged in a passenger compartment, and at least one storage device which is arranged on the vehicle interior component for temporarily depositing and storing at least one object, the storage device being configured in accordance with one of the abovementioned refinements or any desired combination of at least two of these refinements with one another. The advantages which are mentioned above in relation to the storage device are associated accordingly with the vehicle. The vehicle can also have two or more corresponding storage devices.

In accordance with one advantageous refinement, the vehicle interior component is an instrument panel, a center console or a vehicle seat.

Further details, features and advantages of the invention result from the following description and the figures.

BRIEF DESCRIPTION OF THE DRAWINGS

FIG. 10 shows a diagrammatic detailed view of the hinge element of the storage device in accordance with the exemplary embodiment of the invention.

DETAILED DESCRIPTION OF THE DRAWINGS

Figure 1:
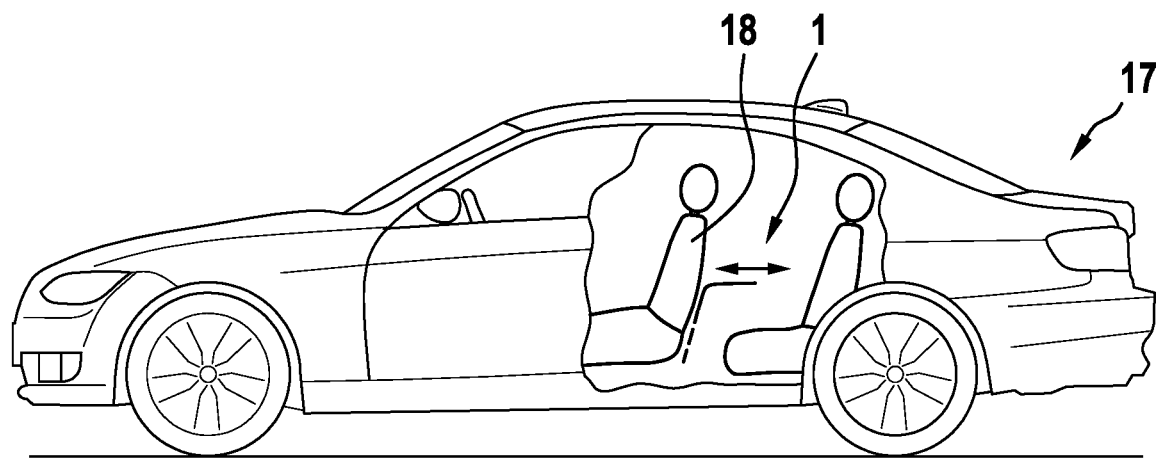
FIG. 1 shows a diagrammatic view of a vehicle in accordance with one exemplary embodiment of the invention.

FIG. 1 diagrammatically shows a vehicle 17 in accordance with one exemplary embodiment of the invention. The vehicle 17 comprises a plurality of vehicle interior components 18, a vehicle seat being shown by way of example in FIG. 1 as a vehicle interior component 18. A storage device 1 in accordance with one exemplary embodiment of the invention is arranged on the vehicle interior component 18. Here, at least one part of the storage device 1 is guided such that it can be displaced in a drawer-like manner, a curved or angled movement path being provided, in order firstly to realize a table-like rest position, and secondly in order to transfer the storage device 1 into a space-saving storage position.

Figure 2:
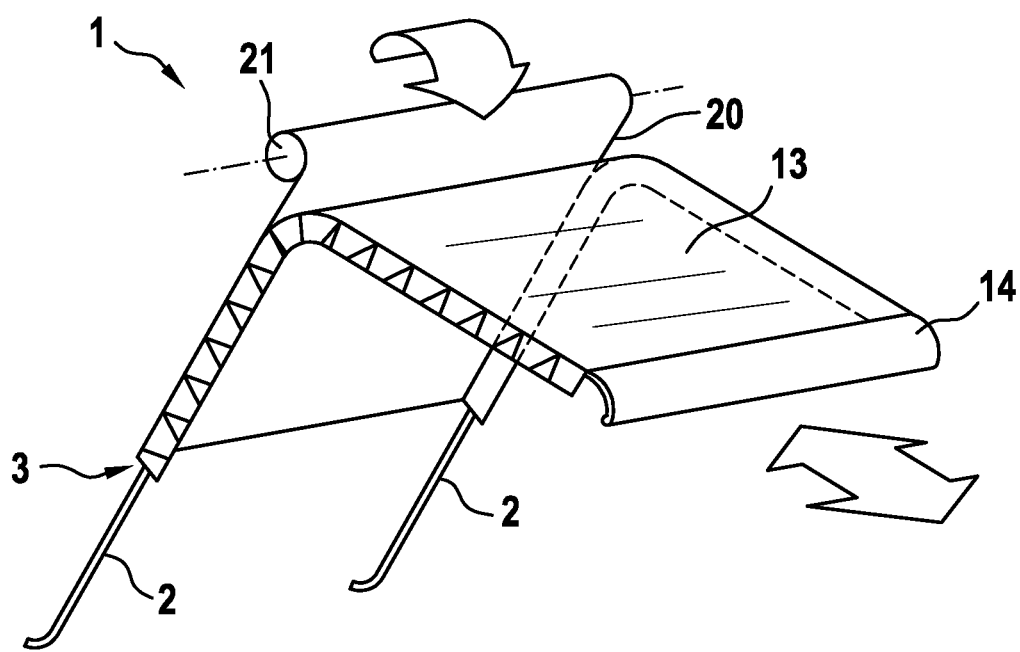
FIG. 2 shows a diagrammatic view of a storage device in accordance with one exemplary embodiment of the invention.

FIG. 2 shows a diagrammatic perspective illustration of the storage device 1 in accordance with one exemplary embodiment of the invention, which storage device 1, as shown in FIG. 1, can be attached to a vehicle interior component 18 of the vehicle 17. In particular, the storage device is transferred at least partially into the rest state.

Figure 3:
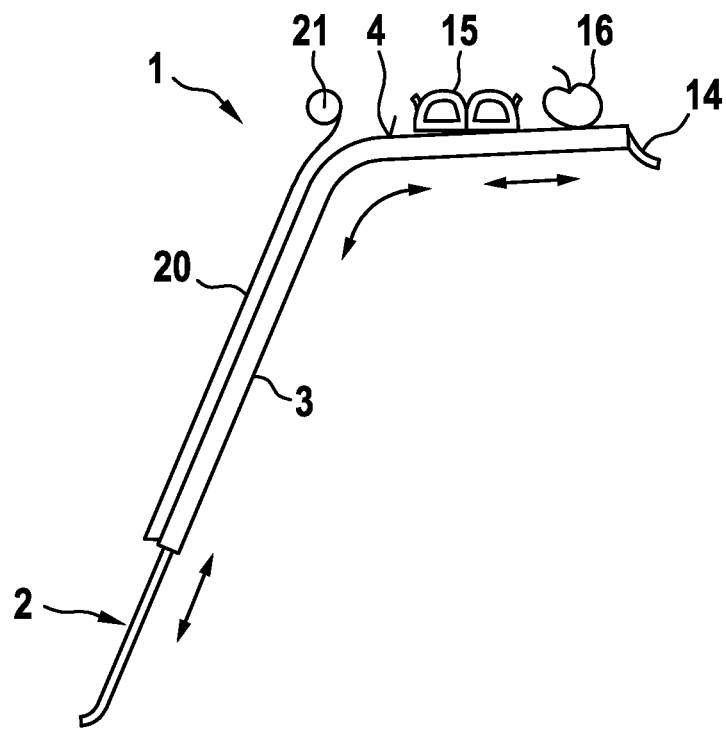
FIG. 3 shows a diagrammatic side view of the storage device in accordance with the exemplary embodiment of the invention, in a partially extended position.
Figure 4:
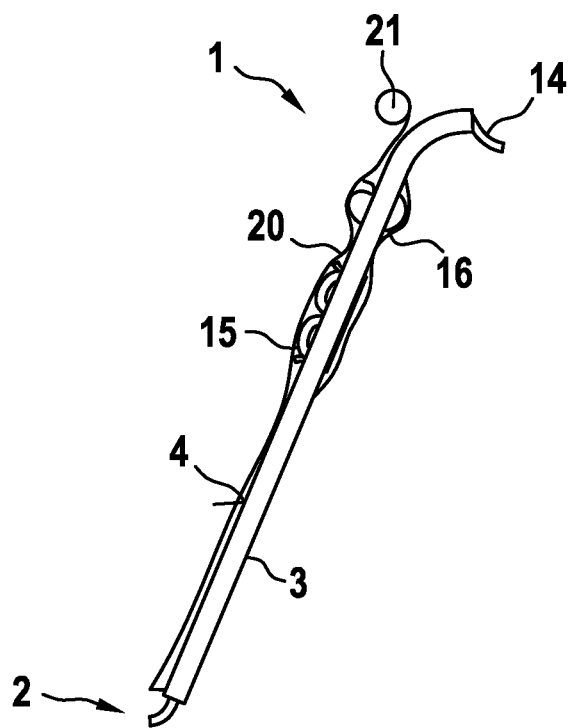
FIG. 4 shows a diagrammatic side view of the storage device in accordance with the exemplary embodiment of the invention, in a retracted position.

FIG. 3 diagrammatically shows a sectional illustration of the storage device 1 as shown in FIG. 2. The storage device 1 is therefore situated at least partially in the rest position. FIG. 4 shows a diagrammatic sectional illustration of the storage device 1 in the storage state. As a result, the storage state arises from the rest state by virtue of the fact that the hinge elements 3 have been moved manually or automatically.

The storage device 1 has a guide unit 2 which can be arranged on the vehicle interior component 18. Two hinge elements 3 of the storage device 1 are arranged on the guide unit 2, which hinge elements 3 are guided by means of the guide unit 2 such that they can be displaced in a drawer-like manner. The two hinge elements 3 are connected to one another via a rest part 13. The rest part 13 serves, in particular, for the user to deposit objects or for use as a table-like support.

Moreover, the storage device 1 comprises a covering element 20 of flexible configuration and a winding device 21 which is arranged in a stationary manner for winding/unwinding the covering element 20. A displacement direction of the hinge elements 3 is indicated by way of double arrows, a winding axis of the winding device 21 being oriented transversely with respect to this displacement direction of the hinge elements 3. The covering element 20 is of elastic configuration. The covering element 20 and the winding device 21 are, in particular, optional, and can be dispensed with.

A free end section of the covering element 20, which free end section is arranged so as to face away from the winding device 21, is fixed on an end section of the rest part 13, which end section of the rest part 13 lies opposite a rest end section (shown on the right in FIG. 3) of the rest part 13 for manual actuation of the rest element 3. A handle 14 is fixed on the rest end section of the rest part 13. The handle 14 serves for manual actuation of the storage device 1. As an alternative, a displacement of the hinge elements 3 with respect to the guide unit can also take place by way of an actuator. In this case, the handle 14 can be dispensed with.

The guide unit 2 is configured and arranged relative to the winding device 21 in such a way that the rest end section of the rest part 3 can be moved away from the winding device 21 by a predefined extent, as shown in FIGS. 2 to 4. As a result, the rest element 3 can be moved into the rest position, with the result that objects, for example glasses 15 and an apple 16, can be deposited on the rest element 3 (cf. FIG. 3). Furthermore, the guide unit 2 is configured in such a way that the hinge elements 3 and therefore the rest part 13 are guided by means of the guide unit 2 such that they can be displaced in a drawer-like manner along an angled-away movement path. As a result, in the case of the exemplary embodiment which is shown, the hinge elements 3 are deflected downward in the case of a movement into its storage position which is shown in FIG. 4.

The guide unit 2 has a dedicated guide device, in particular, on each edge region (not shown) of the hinge elements 3 which exists with regard to the displacement direction of the hinge elements 3. The respective guide device is, in particular, a stationary guide rail, in which parts of the hinge elements 3 are guided displaceably. The guide rails run parallel to one another.

In the storage position of the storage device 1, the covering element 20 has been unwound from the winding device 21. In addition, the objects, for example the glasses 15 and the apple 16, have been received between the rest element 3 and the covering element 20, as a result of which the covering element 20 has been deformed elastically as shown. By way of a reversal of these kinematics, the storage device 1 can be transferred again into its rest state.

The storage device 1 can preferably have at least one lamp (not shown) which is arranged on the hinge elements 3 or the rest part 13. In this way, the hinge elements 3 and the rest part 13 can be recognized rapidly even in the case of darkness. In particular, a current position of the storage device 1 can be detected rapidly and simply.

Figure 5:
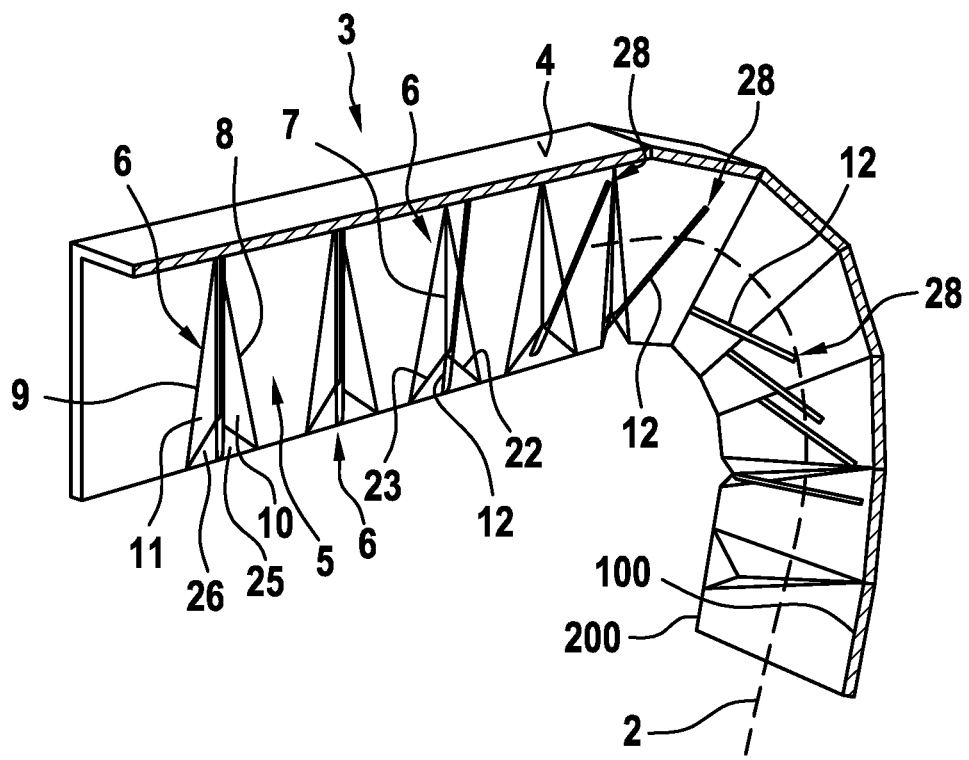
FIG. 5 shows a diagrammatic illustration of a hinge element of the storage device in accordance with the exemplary embodiment of the invention.

FIG. 5 diagrammatically shows a sectional view of one of the hinge elements 3 of the storage device 1. The two hinge elements 3 are, in particular, of mirror-inverted configuration.

The hinge element 3 has a U-shaped cross section with a rest face 4 and side walls 5 which extend, in particular, perpendicularly with respect to the rest face 4. In FIG. 5, the hinge element 3 is, in particular, shown in a sectioned manner in the center between the two side walls 5. The side walls extend in each case between a first end 100, at which the side walls are connected to the rest face 4, and a second end 200 which is a free end. Each side wall 5 has a plurality of folding regions 6 which are arranged in series in the longitudinal direction of the hinge element 3. The folding elements serve to make it possible for the hinge element 3 to be displaced along the curved or angled movement path. In particular, each side wall can be curved or reinforced on the basis of the folding region 6. The latter variant serves, in particular, for use of the storage device as a table-like support.

Each folding region 6 comprises a first folding line 7, a second folding line 8 and a third folding line 9. The first folding line 7 is arranged between the second folding line 8 and the third folding line 9. All of the folding lines 7, 8, 9 extend between the first end 100 and the second end 200. By way of the folding lines 7, 8, 9, the folding region 6 can be folded in such a way that the second end 200 is shortened in comparison with the first end 100. This makes guidance of the hinge element 3 along the curved or angled movement path possible.

In the example which is shown, the first folding line 8 extends perpendicularly with respect to the first end 100 and the second end 200. The second folding line 8 and the third folding line 9 are arranged symmetrically with respect to the first folding line 7, and intersect the first folding line 7 at the first end 100. As a result, a first hinge part 10 and a second hinge part 11 are defined, the first hinge part 10 being configured between the first folding line 7 and the second folding line 8, and the second hinge part 11 being configured between the first folding line 7 and the third folding line 9. Therefore, the hinge parts 10, 11 are of triangular configuration, and are delimited by way of the folding lines 7, 8, 9 and the second end 200. In particular, each hinge part 10, 11 is a right-angled triangle, the entire folding region 6 which is delimited by way of the second end 200, the second folding line 8 and the third folding line 9 forming an equilateral triangle.

Moreover, the folding region 6 has a fourth folding line 22 and a fifth folding line 23. The fourth folding line 22 and the fifth folding line 23 extend from the second end 200 to a common intersection point 24 on the first folding line 7. In this case, the fourth folding line 22 and the fifth folding line 23 extend starting from the same points on the second end 200 as the second folding line 8 and the third folding line 9 as well. A third hinge part 25 is therefore delimited from the first hinge part 10 by the fourth folding line 22, while a fourth hinge part 26 is delimited from the second hinge part 11 by the fifth folding line 23.

The folding regions 6 of the hinge element 3 are formed, in particular, as integral hinges. This makes simple and inexpensive production of the hinge elements 3 possible. In particular, the hinge elements 3 are manufactured from a plastic, for example by way of injection molding.

In order to guide the hinge element 3 along a curved or angled movement path, it is provided that the folding regions 6 are transferred at least partially into a folded state. This means that the first hinge part 10 and the second hinge part 11 are folded to form a peak or to form a trough, the third hinge part 25 and the fourth hinge part 26 likewise being folded to form a peak or trough at the same time. The folding of the first hinge part 10 and second hinge part 11 and of the third hinge part 25 and fourth hinge part 26 is opposing. The first folding line 7 therefore represents both a highest and a lowest region, the intersection point 24 representing a boundary between the highest region and lowest region. By way of the folding, shortening of the second end 200 relative to the first end 100 takes place, as a result of which a curvature of the hinge element 3 is brought about. A curvature radius can be set by way of a degree of the folding.

The folding of the folding regions 6 is forced, in particular, by way of the guide unit 2. Therefore, the guide unit 2 preferably serves firstly to guide the movement of the hinge elements 3, and secondly to fold in and/or fold out the folding regions 6 of the hinge elements 3 and to make the curved or angled movement of the hinge elements 3 possible. In addition, the guide unit 2 can transfer the folding regions 6 into a state which reinforces the side walls 5, with the result that the hinge elements 3 can leave the guide unit 2, in order to serve as a rigid, table-like support.

In order to enable the folding of the folding regions 6, lever elements 12 are provided. A lever element 12 is attached in each case to a first folding line 7 between the second end 200 and intersection point 24. The lever element 12 is therefore attached at one end to the folding region 6 and at the other end has a free lever end 28. By pivoting the lever element 12, the associated folding region 6 can be folded, the third hinge part 25 and the fourth hinge part 26 firstly being folded by the lever element 12, and this folding causing folding of the first hinge part 10 and second hinge part 11.

Figure 6:
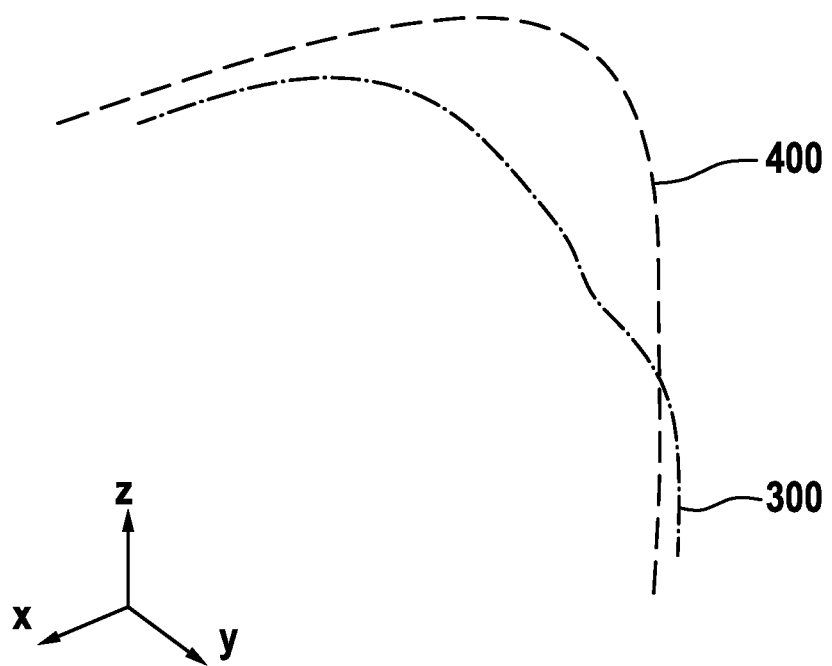
FIG. 6 shows a first diagrammatic illustration of the guide unit of the storage device in accordance with the exemplary embodiment of the invention.
Figure 7:
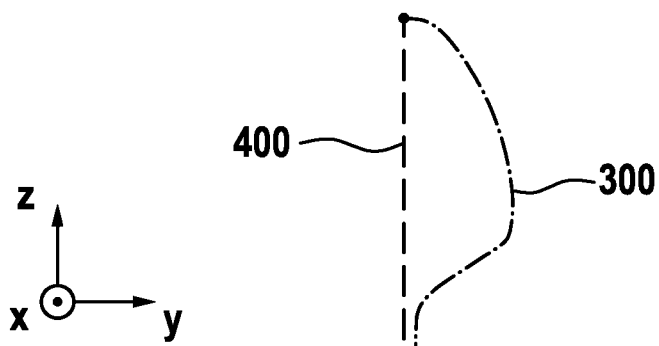
FIG. 7 shows a second diagrammatic illustration of the guide unit of the storage device in accordance with the exemplary embodiment of the invention.
Figure 8:
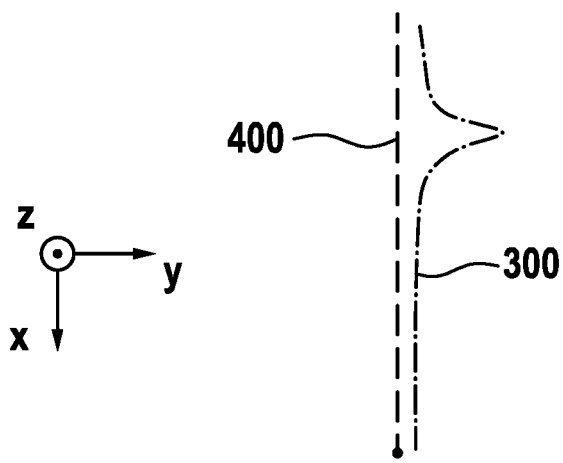
FIG. 8 shows a third diagrammatic illustration of the guide unit of the storage device in accordance with the exemplary embodiment of the invention.
Figure 9:
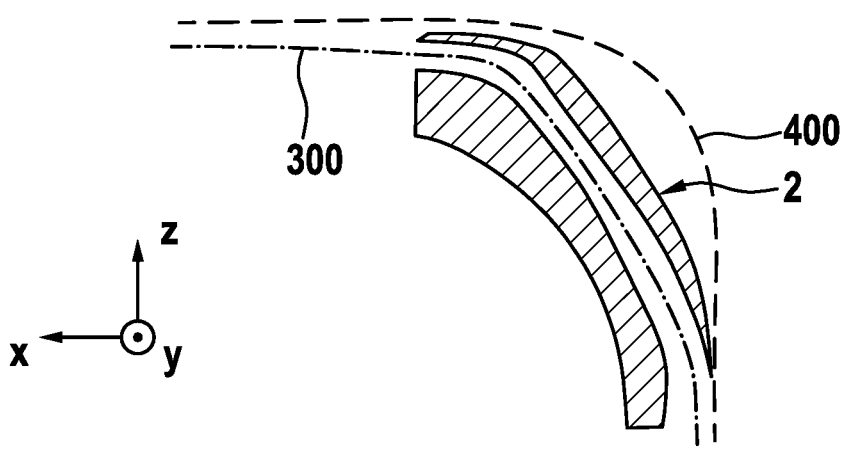
FIG. 9 shows a fourth diagrammatic illustration of the guide unit of the storage device in accordance with the exemplary embodiment of the invention.

FIG. 6 diagrammatically shows a three-dimensional representation of a first movement path 300 of the lever end 28 and of a second movement path 400 of the first end 100 of the hinge element 3. FIGS. 7 to 9 show a diagrammatic two-dimensional representation of the two movement paths 300, 400 in each case from one spatial direction.

The guide unit 2 achieves a situation where the lever element 12 carries out a pivoting movement which leads to pivoting of the lever element 12 from a position parallel to the side wall 5 to a position perpendicular with respect to the side wall 5. In order to achieve this pivoting, a movement of the lever end 28 away from the side wall 5 is necessary, in particular. This therefore results, in particular, in the course shown in FIG. 7 and FIG. 8 of the first movement path 300 which moves away from the second movement path 400 in the y-direction. By way of the pivoting of the lever element 12, moreover, the lever end 28 carries out a movement path which lies radially within the second movement path 400 with regard to the xz-plane. The first movement path can be set by way of a corresponding arrangement of the guide unit.

Figure 13:
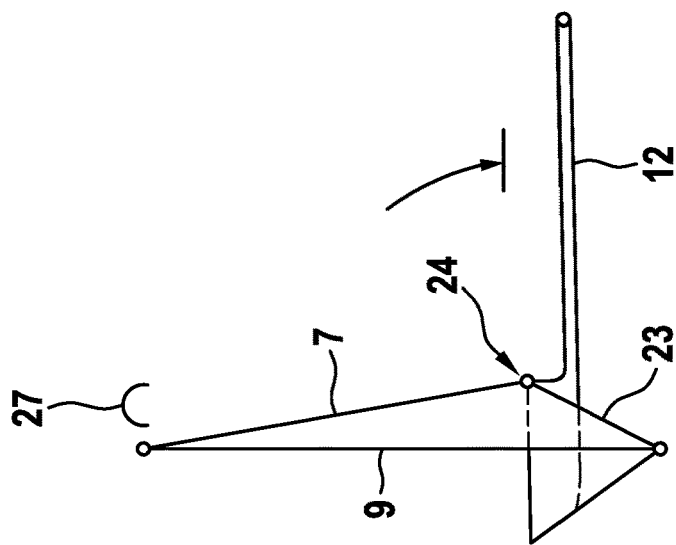
FIG. 13 shows a third diagrammatic illustration of the functional principle of the hinge element in accordance with the exemplary embodiment of the invention.
Figure 12:
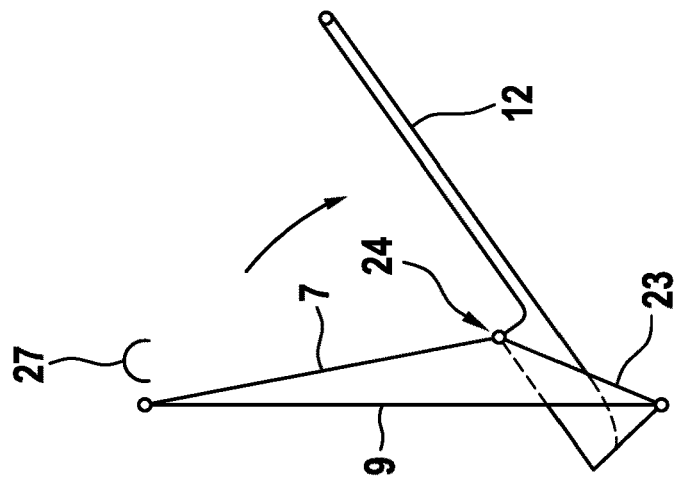
FIG. 12 shows a second diagrammatic illustration of the functional principle of the hinge element in accordance with the exemplary embodiment of the invention.
Figure 11:
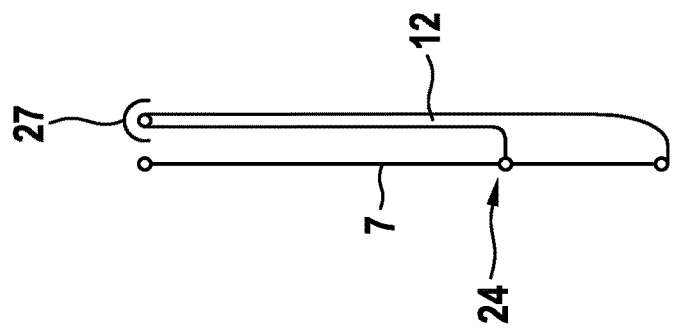
FIG. 11 shows a first diagrammatic illustration of the functional principle of the hinge element in accordance with the exemplary embodiment of the invention.

FIG. 10 diagrammatically shows a detailed view of a side wall 5 of the hinge element 3 with a plurality of folding regions 6 which have all the different folds. FIGS. 11 to 13 diagrammatically show the folding operation.

In order to reinforce the hinge element 3 on a folding region 6, the associated lever element 12 is oriented parallel to the side wall 5 and is locked on the side wall 5. To this end, a locking means 27 is provided. This state is shown, in particular, in FIG. 11. If the folding region 6 is reinforced, it is not folded or is almost not folded. As a result, the hinge element 3 can leave the guide unit 2 and can serve as a table-like support.

FIGS. 12 and 13 diagrammtically show the principle of the folding operation of the folding region 6 for bending the hinge element 3. To this end, folding of the third hinge part 25 and the fourth hinge part 26 to form a peak is initiated by way of the pivoting of the lever element 12. This firstly brings about folding of the first hinge part 10 and the second hinge part 11 to form a trough. The third hinge part 25 and the fourth hinge part 26 are pivoted together with the lever element 12 and, in the completely folded position of the folding region 6, are pivoted in comparison with the unfolded position by an angle of 90° with regard to the intersection point 24. Therefore, the fourth folding line 22 and the fifth folding line 23 serve predominantly to convert the pivoting of the lever element 12 from the position parallel to the side wall 5 to the position perpendicular with respect to the side wall 5 into the folding of the folding region 6. Together with the first folding line 7, the second folding line 8 and the third folding line 9 serve to shorten the second end 200 with respect to the first end 100, with the result that the curvature of the hinge element 3 is achieved.

By way of the guide unit 2, each lever element 12 can be guided in such a way that a curved or angled movement path of the storage device 1, in particular of the rest part 13, is made possible. Moreover, the lever elements 12 can be fixed by way of the locking means 27, in order to reinforce the hinge elements 3, with the result that the storage device 1, in particular the rest part 13, can be used as a table-like support.

LIST OF DESIGNATIONS

1 Storage device
2 Guide unit
3 Hinge element
4 Rest face
5 Side wall
6 Folding region
7 First folding line
8 Second folding line
9 Third folding line
10 First hinge part
11 Second hinge part
12 Lever element
13 Rest part
14 Handle
15 Object (glasses)
16 Object (apple)
17 Vehicle
18 Vehicle interior component
19 Stop
20 Covering element
21 Winding device
22 Fourth folding line
23 Fifth folding line
24 Intersection point
25 Third hinge part
26 Fourth hinge part
27 Locking means
28 Lever end
100 First end
200 Second end

What is claimed is:

1. A storage device for a vehicle, comprising:
at least one guide unit which arrangeable on a vehicle interior component;
at least one hinge element which is guided on and along the guide unit so as to be displaceable in a drawer-type manner on a curved or angled-away movement path, wherein
the hinge element has a rest face and at least one side wall which is angled away with respect thereto,
the side wall has a first end, at which the side wall bears against the rest face, and a second end which lies opposite the first end,
the side wall has a multiplicity of folding regions which comprise a first folding line, a second folding line, a third folding line, a fourth folding line and a fifth folding line,
the first folding line is placed between the second folding line and the third folding line, with a result that a first hinge part is formed between the first folding line and the second folding line, and a second hinge part is formed between the first folding line and the third folding line,
the second folding line and the third folding line are of non-parallel configuration with respect to one another, and a first spacing between the second folding line and the third folding line at the first end is smaller than a second spacing between the second folding line and the third folding line at the second end,
the fourth folding line extends between the first folding line and the second folding line from the second end to the first folding line, and the fifth folding line extends between the first folding line and the third folding line from the second end to an intersection point of the first folding line and fourth folding line,
a lever element is attached on each first folding line between the second end and the intersection point with the fourth folding line and fifth folding line, and
each lever element is rotatable away from the associated first folding line by way of the guide unit, in order to transfer the first hinge part and the second hinge part selectively into a state which is folded into a peak or trough.

2. The storage device according to claim 1, wherein the second folding line and the third folding line are arranged symmetrically with respect to the first folding line.

3. The storage device according to claim 1, wherein the first folding line, the second folding line and the third folding line meet one another at the first end.

4. The storage device according to claim 1, wherein both the first hinge part and the second hinge part have a right-angled triangle-shape.

5. The storage device according to claim 1, wherein the second folding line and the third folding line form an equilateral triangle together with a part region of the second end.

6. The storage device according to claim 1, wherein the lever elements are arranged in parallel with the side wall when the folding regions have a minimum fold.

7. The storage device according to claim 6, wherein the lever elements are lockable on the side wall.

8. The storage device according to claim 1, wherein the second folding line and the fourth folding line, and the third folding line and the fifth folding line, respectively, meet one another at the second end.

9. The storage device according to claim 1, wherein the hinge element has two side walls, the side walls being configured in parallel with one another and form a U-shape with the rest face.

10. The storage device according to claim 1, wherein at least two hinge elements are arranged in parallel and the rest faces of which are connected to a rest part.

11. The storage device according to claim 1, further comprising:
at least one covering element of flexible configuration which is arranged on a rest side of the rest part; and at least one winding device which is arrangeable in a stationary manner for winding/unwinding the covering element, which winding device defines a winding axis oriented transversely with respect to a displacement direction of the rest part, wherein the covering element is of elastic configuration, a free end section of the covering element, which free end section is arranged so as to face away from the winding device, is fixed on an end section of the rest element, which end section lies opposite a rest end section of the rest part for placing at least one object on the extended rest part, and the guide unit is configured and is arranged relative to the winding device such that the rest end section of the rest part is movable away from the winding device by a predefined extent.

12. The storage device according to claim 1, wherein the folding region is configured as an integral hinge.

13. A vehicle, comprising:

at least one vehicle interior component which is arranged in a passenger compartment; and at least one storage device according to claim 1, wherein the storage device is arranged on the vehicle interior component for temporarily depositing and storing at least one object.

14. The vehicle according to claim 13, wherein the interior component is an instrument panel, a center console or a vehicle seat.

* * * * *